(12) United States Patent
Gigandet et al.

(10) Patent No.: US 9,847,911 B1
(45) Date of Patent: Dec. 19, 2017

(54) SYSTEM AND METHOD FOR CUSTOMIZED PORT CONFIGURATION

(71) Applicant: Juniper Networks, Inc., Sunnyvale, CA (US)

(72) Inventors: Scott A. Gigandet, Groveland, MA (US); Eswaran Srinivasan, Fremont, CA (US); Dmitry A. Shokarev, Mountain View, CA (US); John D. Johnson, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 94 days.

(21) Appl. No.: 14/741,441

(22) Filed: Jun. 16, 2015

(51) Int. Cl.
*H04L 12/24* (2006.01)

(52) U.S. Cl.
CPC ........ *H04L 41/083* (2013.01); *H04L 41/0816* (2013.01); *H04L 41/0853* (2013.01); *H04L 41/0886* (2013.01)

(58) Field of Classification Search
CPC .................................................... H04L 41/083
See application file for complete search history.

(56) References Cited

U.S. PATENT DOCUMENTS

| | | | | | |
|---|---|---|---|---|---|
| 5,926,463 | A * | 7/1999 | Ahearn | ................. | H04L 41/024 370/254 |
| 8,804,733 | B1 * | 8/2014 | Safrai | .................... | H04L 49/10 370/392 |
| 9,269,307 | B1 * | 2/2016 | Aybay | ................... | G09G 3/3426 |
| 2002/0156888 | A1 * | 10/2002 | Lee | ..................... | H04L 12/2697 709/224 |
| 2004/0240461 | A1 * | 12/2004 | Hook | .................... | H04L 49/252 370/431 |
| 2005/0206528 | A1 * | 9/2005 | Hsieh | .................. | H04L 43/0817 340/815.45 |
| 2005/0267966 | A1 * | 12/2005 | Boston | ............... | H04L 41/0853 709/224 |
| 2012/0102543 | A1 * | 4/2012 | Kohli | ..................... | H04L 63/20 726/1 |

(Continued)

OTHER PUBLICATIONS

"Line card", https://en.wikipedia.org/wiki/Line_card, as accessed May 5, 2015, Wikipedia, (Jan. 24, 2005).

(Continued)

*Primary Examiner* — Jason Mattis
(74) *Attorney, Agent, or Firm* — FisherBroyles, LLP

(57) ABSTRACT

The disclosed system may include (1) a modular port concentrator that connects as a modular line card within a router to forward network packets, (2) a profile module, stored in memory, that stores an allowed port configuration profile that defines supported port configurations for the modular port concentrator, (3) a configuration module, stored in memory, that receives an attempted port configuration for the modular line card, (4) an enforcement module, stored in memory, that enforces the allowed port configuration profile by taking remedial action in response to determining that the allowed port configuration profile does not allow the attempted port configuration, and (5) at least one physical processor configured to execute the modular port concentrator, the profile module, the configuration module, and the enforcement module. Various other systems and methods are also disclosed.

20 Claims, 10 Drawing Sheets

(56) References Cited

U.S. PATENT DOCUMENTS

2014/0029627 A1* 1/2014 Kumar .................... H04L 47/22
370/419
2016/0105348 A1* 4/2016 Hu ........................ H04L 12/413
370/241.1

OTHER PUBLICATIONS

"Installing an MX960 MPC", https://www.juniper.net/documentation/en_US/release-independent/junos/topics/task/installation/mpc-mx960-installing.html, as accessed May 5, 2015, TechLibrary, Juniper Networks, Inc., (On or before May 5, 2015).
"Command-line interface", https://en.wikipedia.org/wiki/Command-line_interface, as accessed May 5, 2015, Wikipedia, (Mar. 24, 2004).
"Trusted Platform Module", https://en.wikipedia.org/wiki/Trusted_Platform_Module, as accessed May 5, 2015, Wikipedia, (Jul. 6, 2004).

* cited by examiner

700

702 —
```
chassis {
    fpc <FPC Slot> {
        pic <PIC Slot> {
            pic-mode <10G | 40G | 100G>;
            number-of-ports <Number Of Active Ports>;
        }
    }
}
```

704 —
```
chassis {
    fpc <FPC Slot> {
        pic <PIC Slot> {
            port 0 {
                speed <10g | 40g | 100g>;
            }
            port 1 {
                speed <10g | 40g | 100g>;
            }
            ...
            port N {
                speed <10g | 40g | 100g>;
            }
        }
    }
}
```

706 —
```
chassis {
    fpc <FPC Slot> {
        pic <PIC Slot> {
            port 0 {
                speed <auto>;
            }
            port 1 {
                speed <10g | 40g | 100g>;
            }
            ...
            port N {
                speed <disabled>;
            }
        }
    }
}
```

| MPC Type | PIC/MIC Type | Default Port Profile | Active Ports | Remarks |
|---|---|---|---|---|
| 40x10GE MPC7 | 20x10GE PIC | 10GE | 0-19 | All the active ports will operate in 10GE mode. |
| 480G MRATE MPC7 | 6xQSFPP PIC | 4x10GE | 0-5 | All the active ports will operate in 4x10GE mode. |
| MPC8 | 8x100GE CFP4 MIC | 100GE | 0, 1, 4, 5 | All the active ports will operate in 100GE mode. |
|  | 12xQSFPP MIC | 4x10GE | 0-11 | All the active ports will operate in 4x10GE mode. |
| MPC9 | 8x100GE CFP4 MIC | 100GE | 0-7 | All the active ports will operate in 100GE mode. |
|  | 12xQSFPP MIC | 4x10GE | 0-11 | All the active ports will operate in 4x10GE mode. |

| MPC Type | PIC/MIC Type | Configurable Port Profiles | | | |
|---|---|---|---|---|---|
|  |  | PIC level 10G Profile | PIC level 40G Profile | PIC level 100G Profile | Port level Profile |
| 40x10GE MPC7 | 20x10GE PIC | Yes | No | No | Yes |
| 480G MRATE MPC7 | 6xQSFPP PIC | Yes | Yes | Yes | Yes |
| MPC8 | 8x100GE CFP4 MIC | No | No | Yes | Yes |
|  | 12xQSFPP MIC | Yes | Yes | Yes | Yes |
| MPC9 | 8x100GE CFP4 MIC | No | No | Yes | Yes |
|  | 12xQSFPP MIC | Yes | Yes | Yes | Yes |

SYSTEM AND METHOD FOR CUSTOMIZED
PORT CONFIGURATION

BACKGROUND

Network administrators typically use intermediary network devices to forward network packets to their intended destinations. These intermediary network devices may include switches and routers. For example, some routers may take the form of a chassis with slots for receiving one or more line cards such as modular port concentrators, as discussed further below. The line cards may slide into various ones of the slots to enable the network administrators to plug or unplug one or more network cables or transceivers into the line cards.

Traditional line cards have suffered from one or more disadvantages. For example, traditional line cards and their associated interface cards generally have fixed and uniform network speed capabilities across their various network connection ports. In view of the above, traditional line card manufacturers may manufacture a wide variety of different line cards simply to accommodate the various permutations of network port speed configurations and associated interface cards. In view of the above, the instant disclosure identifies and addresses a need for additional and improved systems and methods for customized port configuration.

SUMMARY

As will be described in greater detail below, the instant disclosure generally relates to systems and methods for customized port configuration. In one example, a system for accomplishing such a task may include (1) a modular port concentrator that connects as a modular line card within a router to forward network packets (and the modular port concentrator may include an interface card that includes a network connection port that supports multiple network speed configurations), (2) a profile module, stored in memory, that stores an allowed port configuration profile that defines supported port configurations for the modular port concentrator, (3) a configuration module, stored in memory, that receives an attempted port configuration for the modular line card through at least one of a static mode that enables a user to define the attempted port configuration through a text-based interface and a dynamic mode that enables the user to define the attempted port configuration by plugging or unplugging at the network connection port, and (4) an enforcement module, stored in memory, that enforces the allowed port configuration profile by taking remedial action in response to determining that the allowed port configuration profile does not allow the attempted port configuration. The system may also include at least one physical processor that is configured to execute one or more of these modules.

Similarly, a method for accomplishing the above-described task may include (1) connecting a modular port concentrator as a modular line card within a router to forward network packets, (2) storing an allowed port configuration profile that defines supported port configurations for the modular port concentrator, (3) receiving an attempted port configuration for the modular line card through at least one of a static mode that enables a user to define the attempted port configuration through a text-based interface and a dynamic mode that enables the user to define the attempted port configuration by plugging or unplugging at the network connection port, and (4) enforcing the allowed port configuration profile by taking remedial action in response to determining that the allowed port configuration profile does not allow the attempted port configuration.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to: (1) store an allowed port configuration profile that defines supported port configurations for a modular port concentrator connected as a modular line card within a router to forward network packets, (2) receive an attempted port configuration for the modular line card through at least one of a static mode that enables a user to define the attempted port configuration through a text-based interface and a dynamic mode that enables the user to define the attempted port configuration by plugging or unplugging at the network connection port, and (3) enforce the allowed port configuration profile by taking remedial action in response to determining that the allowed port configuration profile does not allow the attempted port configuration.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 7 is an exemplary block diagram of exemplary command line interface configurations.

FIG. 9 is an exemplary block diagram of exemplary tables illustrating default port profiles and configurable port profiles according to systems for customized port configuration.

Figure 1:
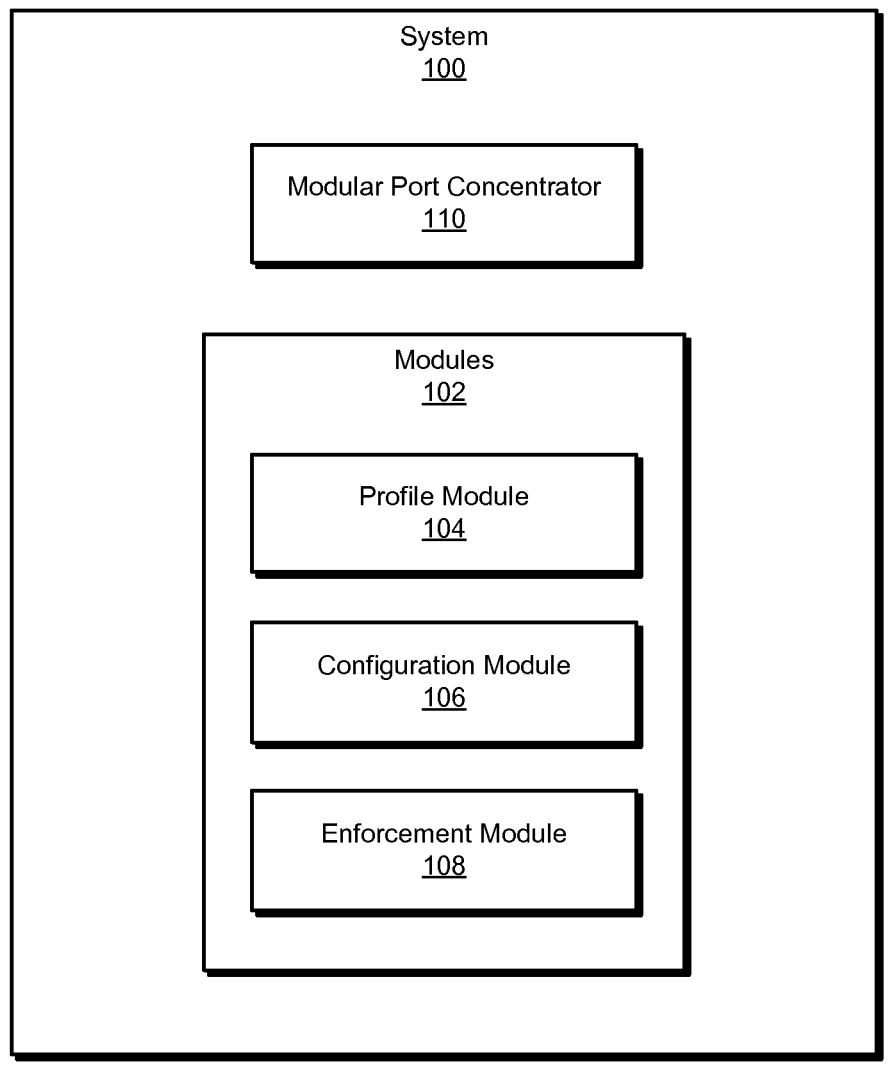
FIG. 1 is a block diagram of an exemplary system for customized port configuration.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for customized port configuration. As will be explained in greater detail below, embodiments of the instant disclosure may enable computing network line cards to achieve benefits that were previously unavailable. For example, embodiments of the instant disclosure may enable computing network line cards to (1) configure different ports of a line card and/or interface card at different network speeds (e.g., on a per-port or per-interface-card basis), (2) reduce the number of line card production models by enabling one or more production models to simulate or emulate a variety of different network speed configurations, (3) restore a user customization of network speed configurations upon a line card or router reboot, (4) enable a user to plug or unplug a network connection port without disturbing other active ports on the line card, (5) disable one network connection port on the line card without disabling other network connection ports, thereby enabling the line card to reduce power consumption, (6) preserve some amount (e.g., a maximum amount) of a user customization of a line card port configuration while correcting or revising the user customization to prevent the violation of one or more system constraints, (7) seamlessly copy a customized port configuration from one modular port concentrator and/or interface card to another different model of a modular port concentrator and/or interface card, and/or (8) intelligently prevent a user from causing the line card to violate one or more constraints in terms of temperature, power, and/or packet forwarding engine bandwidth (e.g., on a per-port or total-port basis), etc.

Figure 2:
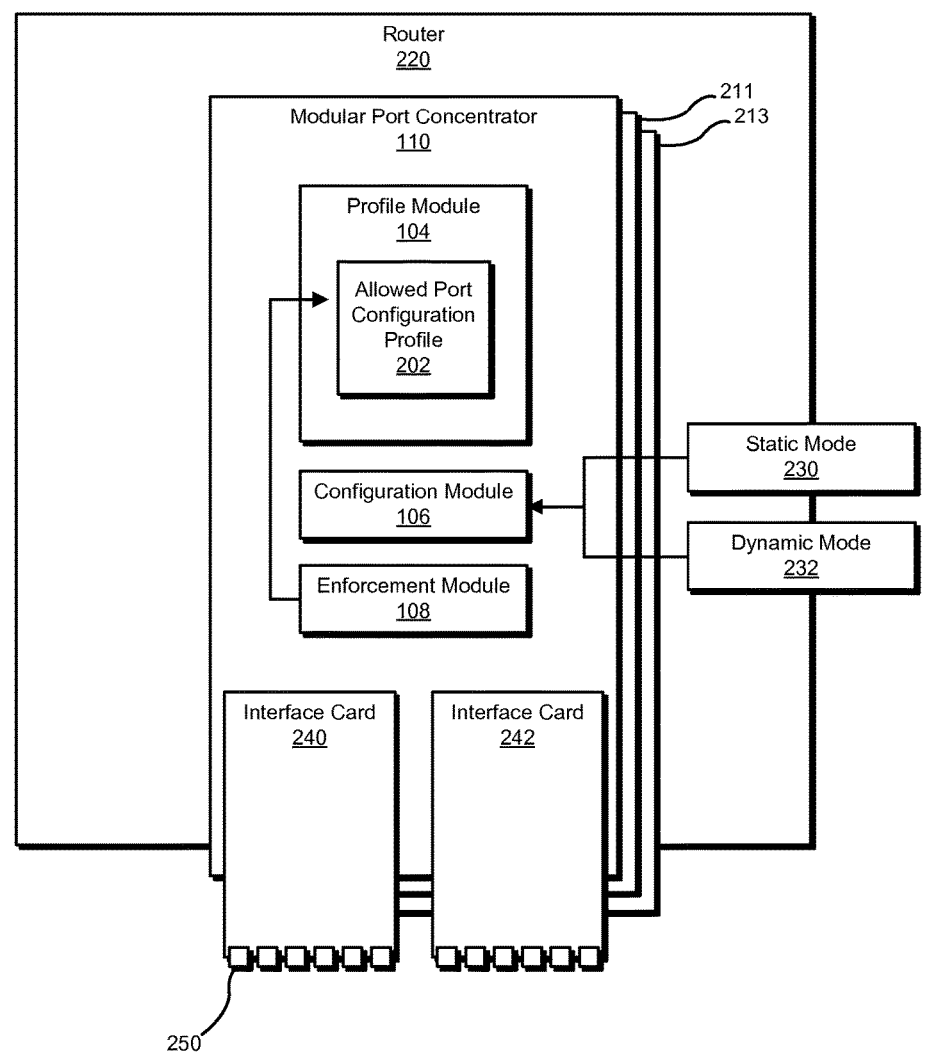
FIG. 2 is a block diagram of an exemplary system for customized port configuration.

The following will provide, with reference to FIGS. 1-2, examples of exemplary systems for customized port configuration. Similarly, the following will provide, with reference to FIGS. 3, 4, and 6, examples of a flow diagram, a timing diagram, and a state diagram corresponding to the exemplary systems for customized port configuration. Moreover, the following will also provide, with reference to FIG. 5, an example of an exemplary router and modular port concentrator. Furthermore, the following will provide, with reference to FIG. 7, examples of exemplary command line interface configurations. Additionally, FIGS. 8 and 9 will provide exemplary command line interface reports and tables illustrating network speed configurations. Finally, the discussion corresponding to FIG. 10 will provide numerous examples of systems that may include the components and circuits shown in FIGS. 1-9.

FIG. 1 is a block diagram of an exemplary system 100 for customized port configuration. As illustrated in this figure, exemplary system 100 may include a modular port concentrator 110. As used herein, the term "modular port concentrator" generally refers to a modular line card that provides packet forwarding services by installing into an adapter card that in turn connects to a backplane of a chassis (e.g., a router chassis). Moreover, modular port concentrators generally incorporate one or more interface cards (e.g., modular interface cards or physical interface cards) that provide physical interfaces to the network, as discussed further below.

As further illustrated in FIG. 1, system 100 may also include one or more modules 102 for performing one or more tasks. For example, and as will be explained in greater detail below, exemplary system 100 may include a profile module 104, stored in memory, that stores an allowed port configuration profile that defines supported port configurations for the modular port concentrator. Exemplary system 100 may also include a configuration module 106, stored in memory, that receives an attempted port configuration for the modular line card through at least one of a static mode that enables a user to define the attempted port configuration through a text-based interface and a dynamic mode that enables the user to define the attempted port configuration by plugging or unplugging at the network connection port. Additionally, exemplary system 100 may include an enforcement module 108, stored in memory, that enforces the allowed port configuration profile by taking remedial action in response to determining that the allowed port configuration profile does not allow the attempted port configuration.

As shown in FIG. 2, in some examples, system 100 may constitute part of a larger networking system 290. System 290 may include a router 220, which may take the form of a larger chassis with accompanying slots for the installation of one or more modular port concentrators, such as modular port concentrator 110. In the example of FIG. 2, modular port concentrator 110 may include profile module 104, configuration module 106, and/or enforcement module 108. In other embodiments, however, one or more of these modules may be located outside of router 220 and/or outside of modular port concentrator 110. For example, one or more of these modules may be located within a network administration computer that provides a command line interface for managing router 220. Moreover, one or more of these modules may be located within internal memory (e.g., a memory chip or module) of router 220 and/or modular port concentrator 110 (e.g., within modular port concentrator 110 but outside of an interface card 240 and an interface card 242).

As shown in FIG. 2, modular port concentrator 110 may connect as a modular line card within router 220 to forward network packets. Modular port concentrator 110 may include an interface card (such as interface card 240 and/or interface card 242) that includes a network connection port 250 that supports multiple network speed configurations. Examples of the interface card may include modular interface cards and physical interface cards. Examples of network connection port 250 may be configured to receive a fiber optic transceiver, such as a quad small form factor pluggable transceiver or connection (additionally or alternatively, or more specifically, formats corresponding to QSFP28, CFP4, and/or 4x10GE breakout with QSFPP optics, which may each support multiple network speed configurations, etc.). Moreover, as used herein, the term "network speed configurations" generally refers to a configuration that specifies a speed of a network connection and/or a number of network connections provided through a single network connection port. Examples of network speed configurations include 4x10GE, 40GE, and/or 100GE. Moreover, router 220 may include slots for the installation of a multitude of modular port concentrators, including a modular port concentrator 211 and a modular port concentrator 213, as also shown in FIG. 2.

Additionally, and as further shown in FIG. 2, system 290 may also include profile module 104, which may store an allowed port configuration profile 202 that defines supported port configurations for the modular port concentrator (e.g., supported port configurations for one or both of interface card 240 and interface card 242 as installed within modular port concentrator 110). Similarly, system 290 may also include configuration module 106, which may receive an attempted port configuration for the modular line card. Configuration module 106 may receive the attempted port configuration through a static mode 230 that enables a user to define the attempted port configuration through a text-based interface. Additionally or alternatively, configuration module 106 may receive the attempted port configuration through a dynamic mode 232 that enables the user to define the attempted port configuration by plugging or unplugging at network connection port 250. Moreover, as also shown in FIG. 2, system 290 may further include enforcement module 108 that may enforce allowed port configuration profile 202 by taking remedial action in response to determining that allowed port configuration profile 202 does not allow the attempted port configuration. For further context and ease of understanding, FIG. 5 also provides another perspective 500 of router 220, modular port concentrator 110, and network connection port 250.

Figure 3:
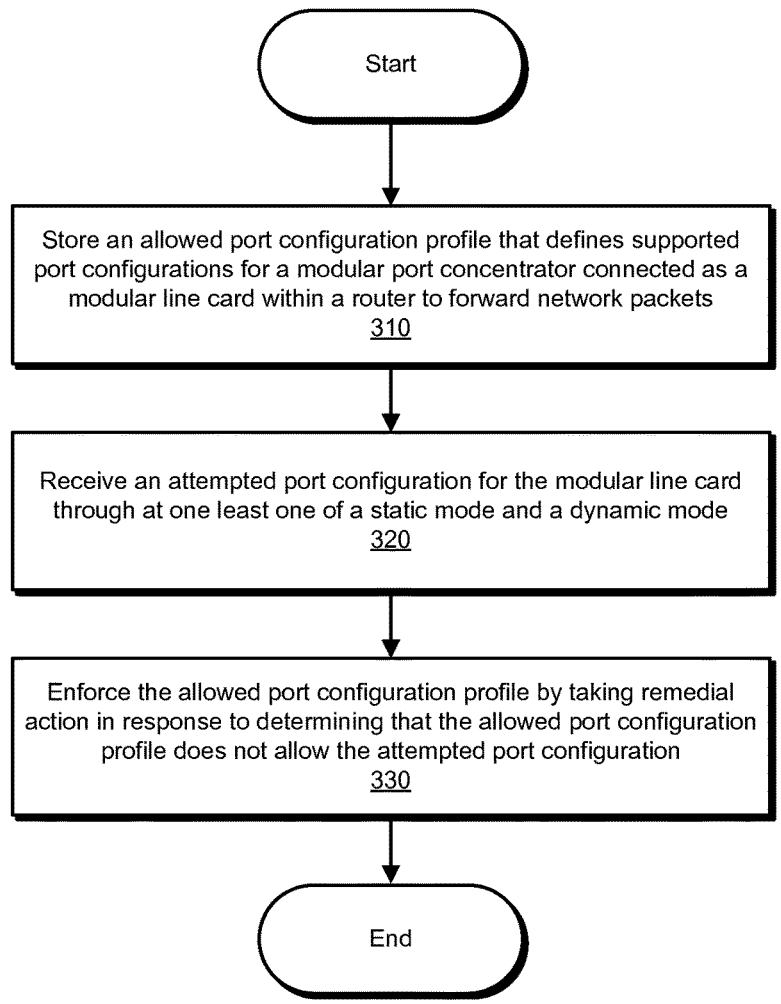
FIG. 3 is a flow diagram of an exemplary method for customized port configuration.

FIG. 3 is a flow diagram of an exemplary computer-implemented method 300 for customized port configuration. Some or all of the steps shown in FIG. 3 may be performed by any suitable computer-executable code and/or computing system (e.g., in cooperation with a network administrator). In some embodiments, the steps shown in FIG. 3 may be performed by one or more of the components of system 100 in FIG. 1, system 290 in FIG. 2, and/or portions of exemplary computing system 1000 in FIG. 10.

As illustrated in FIG. 3, at step 310, one or more of the systems described herein may store an allowed port configuration profile that defines supported port configurations for the modular port concentrator. For example, profile module 104 may, as part of modular port concentrator 110 in FIG. 2, store allowed port configuration profile 202 that defines supported port configurations for modular port concentrator 110.

As used herein, the term "allowed port configuration profile" generally refers to a profile and/or set of rules, conditions, constraints, and/or specifications that define the manufacturer permitted, allowed, tolerable, and/or functioning scenarios for the modular port concentrator, an interface card installed on the modular port concentrator, and/or a network connection port within an associated interface card. The allowed port configuration profile may define allowable configurations on an absolute or conditional basis. For example, the allowed port configuration profile may define an absolute limitation for a single port that can never be exceeded. Alternatively, the allowed port configuration profile may define a conditional limitation for the single port that can be exceeded in some circumstances but not in other circumstances. For example, the allowed port configuration profile may specify that the total bandwidth on the modular port concentrator and/or interface card may not exceed a specified bandwidth.

In some examples, the manufacturer of the router, modular port concentrator, interface card, and/or network port connection or transceiver may specify the allowed port configuration profile in part or in entirety. In further examples, the manufacturer may encode the allowed port configuration profile within hardware memory. For example, the manufacturer may encode the allowed port configuration profile within hardware memory in a manner that is difficult, infeasible, and/or effectively impossible to disturb, alter, and/or tamper with (e.g., within a TRUSTED PLATFORM MODULE or using a TRUSTED PLATFORM MODULE).

In additional examples, the network administrator and/or user may specify the allowed port configuration profile, such as by creating the allowed port configuration profile originally or by revising, altering, and/or customizing the manufacturer allowed port configuration profile.

Profile module 104 may store the allowed port configuration profile in a variety of ways and contexts. Notably, the systems and methods disclosed herein may apply to both fixed port designs (e.g., modular port concentrators taking physical interface cards) and modular port designs (e.g., modular port concentrators taking modular interface cards). Moreover, the modular port concentrators may include any suitable number of interface cards and/or network connection ports. For example, modular port concentrators may take two or four interface cards, which may result in six, eight, or twelve ports, depending on the specific models and configurations, as discussed further below. Moreover, any particular port in any particular configuration may have specific constraints on its functioning, which the port may or may not share with other ports. For example, a port may support network speed configurations that some other ports can never support. Moreover, the port may support some network speed configurations if other constraints are met in terms of power, temperature, and/or the bandwidth/activity (e.g., a packet forwarding engine constraint of the router) of other ports.

Returning to FIG. 3, at step 320, one or more of the systems described herein may receive an attempted port configuration for the modular line card through at least one of a static mode that enables a user to define the attempted port configuration through a text-based interface and a dynamic mode that enables the user to define the attempted port configuration by plugging or unplugging at the network connection port. For example, configuration module 106 may, as part of modular port concentrator 110 in FIG. 2, receive an attempted port configuration for the modular line card through static mode 230 and/or dynamic mode 232.

As used herein, the term "attempted port configuration" generally refers to any configuration specifications that are attempted through user input regarding the modular port concentrator and/or router. In general, a user or network administrator may attempt the port configuration through either the static mode (e.g., a command line interface) and/or a dynamic mode (e.g., plugging or unplugging at one or more network connection ports, as discussed above). Moreover, as used herein, the term "text-based interface" generally refers to an interface that is substantially or primarily based on the presentation of text information through a screen or display in interaction with a user input device such as a keyboard or pointer device. In other words, the term "text-based interface" generally refers to interfaces in which a user specifies the configuration by specifying text as opposed to establishing or ending network connections. Notably, both the attempted port configuration and the allowed port configuration profile may specify that one or more network connection ports are active (or inactive or dynamically active/inactive) and also specify that the one or more network connection ports are active at a particular network speed configuration. Moreover, configuration module 106 may enable the user to specify a different network speed configuration, from multiple network speed configurations, for the network connection port than for another network connection port on the same modular port concentrator and/or interface card.

Furthermore, as used herein, the phrase "plugging or unplugging" generally refers to opening or closing a network line or cable connection, such as by inserting or removing a network line, cable, and/or intermediary transceiver, such as a fiber optics transceiver, as discussed above. For example, a user may attempt to modify the port configuration by plugging at a network connection port to create a network connection at the port and increase the total bandwidth of the modular line card, which may violate one or more bandwidth constraints (e.g., causing enforcement module 108 to stop or modify the attempted configuration).

In some examples, configuration module 106 receives the attempted port configuration for the modular line card through the static mode that enables the user to define the attempted port configuration through the text-based interface. The text-based interface may include a command line interface, which may be implemented through a display and input device associated with the network, router, modular line card, and/or interface card (e.g., on, at, or network connected to one or more of these).

In the static mode for interface card management, the design choice may consider the following factors to produce deterministic and predictable behavior by the system (e.g., system 100). The static mode of configuration module 106 may provide a mechanism to operate a port in 10, 40, or 100 gigabit mode on a per-port basis. The static mode of configuration module 106 may also ensure that the user-customized configuration is persistent across reboots of the modular port concentrator and/or router. In other words, after the modular port concentrator or router reboots, the modular port concentrator or router may automatically restore the previous user-customized configuration including the number of active ports and/or associated port speeds, as discussed further below. Moreover, the systems and methods described herein (e.g., including the static mode) may provide a migration mechanism (e.g., seamless or single-command mechanism) for migration between different modular port concentrator hardware models (e.g., between JUNIPER MPC7, MPC8, and/or MPC9 models and/or other modular port concentrators).

In some examples of the static mode, configuration module 106 may receive the attempted port configuration by receiving a port profile (e.g., an attempted port profile). The port profile may select a set of ports that will be active in an interface card and the port speed at which the set of ports will be active. The following are several ways in which configuration module 106 may configure the interface card ports using port profiles: (1) all the supported ports in 10GE (e.g., gigabit ETHERNET) mode, (2) all the supported ports in 40GE mode, (3) all the supported ports in 100GE mode, and/or (4) flexible per-port level configuration for 10/40/100G mode. The port profiles can be configured at an interface card level and/or at a per-port level.

Notably, the port profile allows the user to configure the port speed at the level of the interface card. In these examples, all of the ports that support the specified network speed configuration may be activated by default. In some examples, however, this automatic activation may potentially trigger oversubscription of the packet forwarding engine (e.g., under certain conditions). To address this, configuration module 106 (e.g., in cooperation with a user or network administrator) may configure a number-of-ports command (e.g., a command line interface command) to limit the number of active ports, thereby preventing the oversubscription scenario.

FIG. 7 shows example command line interface configurations 700 for customized port configuration, which may include an interface card level static mode configuration 702, a port level static mode configuration 704, and a dynamic mode configuration 706, as discussed further below. In the context of the static mode, interface card level static mode configuration 702 specifies a "pic-mode" or "mic-mode" with the associated network speed configuration (e.g., 10G, 40G, or 100G). Interface card level static mode configuration 702 also includes a "number-of-ports" command that specifies the number of active ports, thereby enabling configuration module 106 and/or a network administrator to avoid packet forwarding engine oversubscription or violation of other system constraints.

Notably, configuration module 106 and/or another module within system 100 may only create the physical interface (e.g., physical interface device or "IFD") for the active ports. Moreover, switching between the interface card modes (e.g., between per-interface card, per-port, and dynamic modes) may trigger an interface card "bounce," reboot, disconnect, and/or restart. Nevertheless, if configuration module 106 receives an attempted port configuration that attempts to change the number-of-ports configuration (as discussed above for FIG. 7), the attempt may not trigger an interface card "bounce," reboot, disconnect, and/or restart. Instead, the attempt may create and/or delete the physical interfaces on the affected ports without disturbing the non-affected ports.

As discussed above, the port profile at the interface card level provides a mechanism to operate all of the interface card ports at the same speed. Alternatively, configuration module 106 may receive the port profile defined at the port level rather than the interface card level. This port profile model enables the user to select the ports to be active in the interface card and the associated network speed configuration for each of the selected ports. Because the user has control over defining the number of active ports and the associated network speed configurations on the port level, the user (e.g., in cooperation with enforcement module 108) may prevent a packet forwarding engine oversubscription scenario by appropriately limiting the number of active ports and/or limiting the network speed configuration at one or more of the ports. Returning to FIG. 7, port level static mode configuration 704 shows how the user may specify which ports are active by further specifying the port number (e.g., port 0, port 1, port N) as well as the associated network speed configuration for one or more of these ports (e.g., 10G, 40G, 100G).

In some examples of per-port static mode configuration, the only ports to be activated will be the ports specified in the configuration (e.g., ports not specified or mentioned within the configuration may be deactivated or remain deactivated). Moreover, configuration module 106 may only create the physical interfaces (e.g., the IFDs) for the active ports. When a port-specific profile configuration is changed (e.g., an individual port is activated, deactivated, put into automatic mode, taken out of automatic mode, and/or has a static network speed configuration altered), configuration module 106 and/or another module within system 100 may "bounce," reboot, disconnect, and/or restart the interface card and/or reset the modular port concentrator (or require/prompt the user to do so) for the new port-specific profile to take effect.

Notably, in some examples, configuration module 106 may receive attempted port configurations at the per port level and/or the per interface card level. Nevertheless, if both the per port level and the per interface card level are configured simultaneously, or otherwise conflict, then the text-based interface may simply fail to implement or commit one or both of the attempted configurations. The text-based interface may also issue an appropriate error message.

Moreover, in the static mode, configuration module 106 may configure the port profile without the physical presence of the modular port concentrator. In these examples, there may be no possible or practical mechanism to validate the port profile against the specific model of the modular port concentrator during the time of committing or attempting the command through the text-based interface. Accordingly, configuration module 106 may commit or implement the attempted configuration, rather than failing to commit the configuration, in the absence of the physical modular port concentrator.

Figure 6:
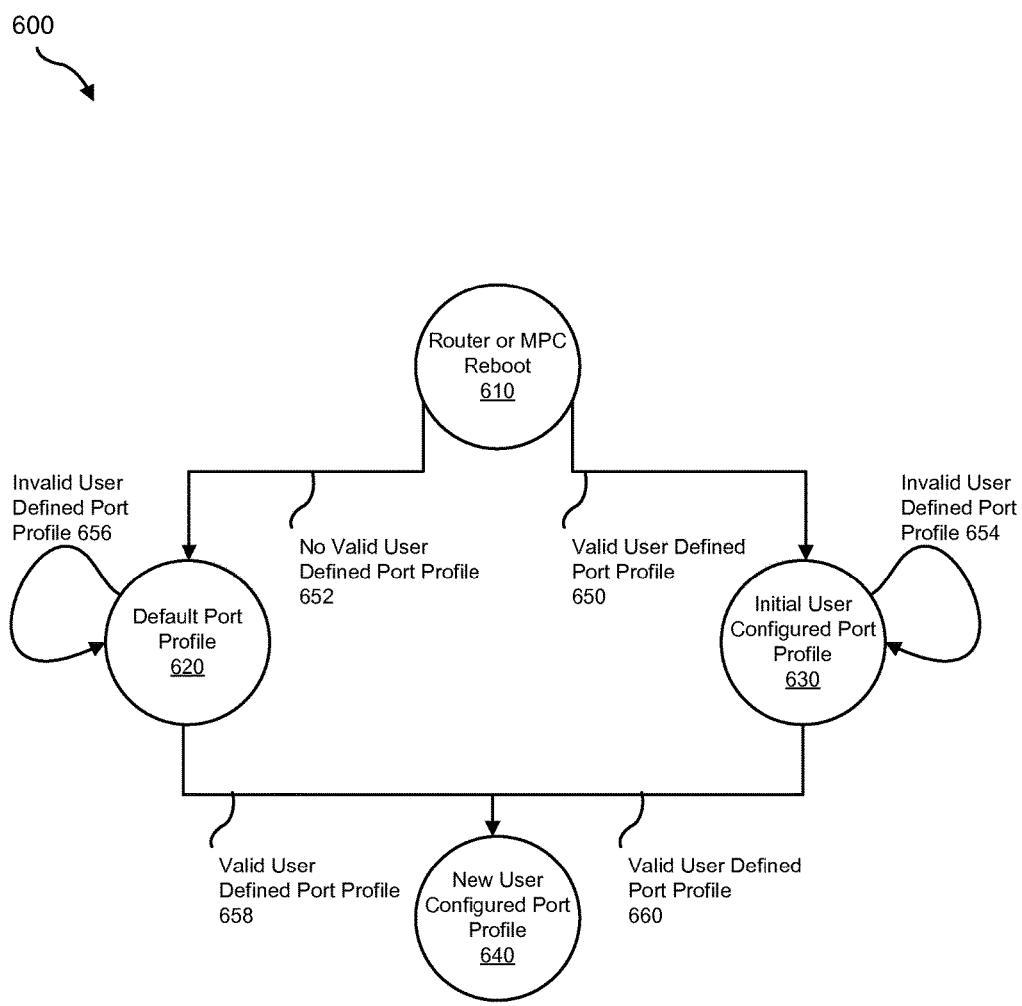
FIG. 6 is an exemplary state diagram that corresponds to an exemplary system for customized port configuration.

In view of the above, the disclosed systems and methods may implement a type of state machine to handle missing or invalid user-customized configurations. FIG. 6 shows an example state diagram 600 that further illustrates different states and state transitions according to these systems and methods. In the example of FIG. 6, the start state may correspond to router or modular port concentrator reboot 610. From this state, a valid user-defined port profile may exist at step 650 or, instead, no valid user defined port profile may exist at step 652. Notably, a port profile or attempted port configuration may be valid or invalid in terms of complying with allowed port configuration profile 202 (e.g., by complying with or violating one or more conditions in terms of bandwidth, temperature, power, and/or other sensor or resource consumption constraints). From step 652, the state diagram may transition to default port profile 620 for the associated interface card, which may correspond to the default, preinstalled, and/or manufacturer installed port profile. Notably, if a user-customized profile exists, but is invalid, then configuration module 106 may issue an alarm or error message. Moreover, the systems and methods herein may attempt to load port profiles for each of the plurality of interface cards installed or inserted within the modular port concentrator (e.g., attempt to locate or load the user-customized or default profile during the boot process of step 610). The state diagram may remain at default port profile 620 so long as no valid user defined port profile exists, as indicated by step 656.

Alternatively, from step 650 the state diagram may transition to initial user configured port profile 630, which may correspond to the previously set up or committed user configured port profile (e.g., prior to router or modular port concentrator reboot 610). The state diagram may remain at initial user configured port profile 630 as long as there is no second or additional valid user defined port profile, as indicated by step 654. Upon the reception or acceptance of a valid user-defined port profile at step 658 or step 660, the state diagram may transition to new user configured port profile 640. Notably, if a port profile configuration is changed on the modular port concentrator while the modular port concentrator is running (e.g., after booting), then configuration module 106 may generate an alarm or prompt that requests the user to "bounce," disconnect, reboot, and/or reset the interface card, or reset the modular port concentrator, in order for the new configuration to take effect. The prompt to bounce the interface card may address a failure of some application-specific integrated circuits to support reconfiguration between different network speed configuration modes (e.g., a failure to support partial reconfiguration between 1x40GE and 4x10GE modes).

In general, as illustrated by state diagram 600, the systems and methods herein may restore a previously committed user-customized port configuration upon rebooting the router or modular port concentrator rather than reverting to a default or manufacturer configuration. Furthermore, at any point, reception of an invalid port profile or attempted port configuration may result in the issuing of an error message or alarm and the retaining or continued use of the previous configuration, which may correspond to the default configuration or the last valid user-customized configuration.

Figure 4:
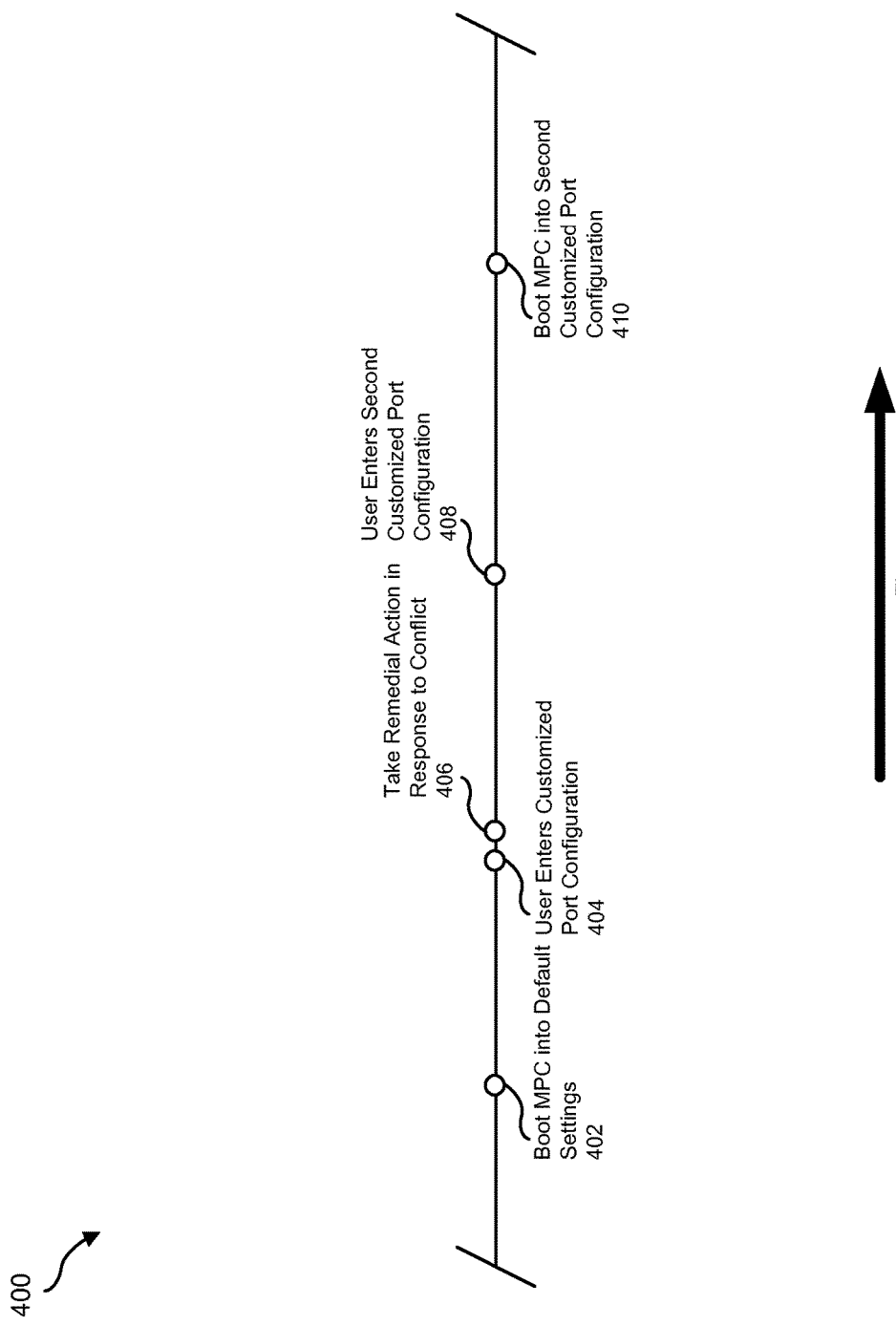
FIG. 4 is a timing diagram that corresponds to an exemplary system for customized port configuration.
Figure 5:
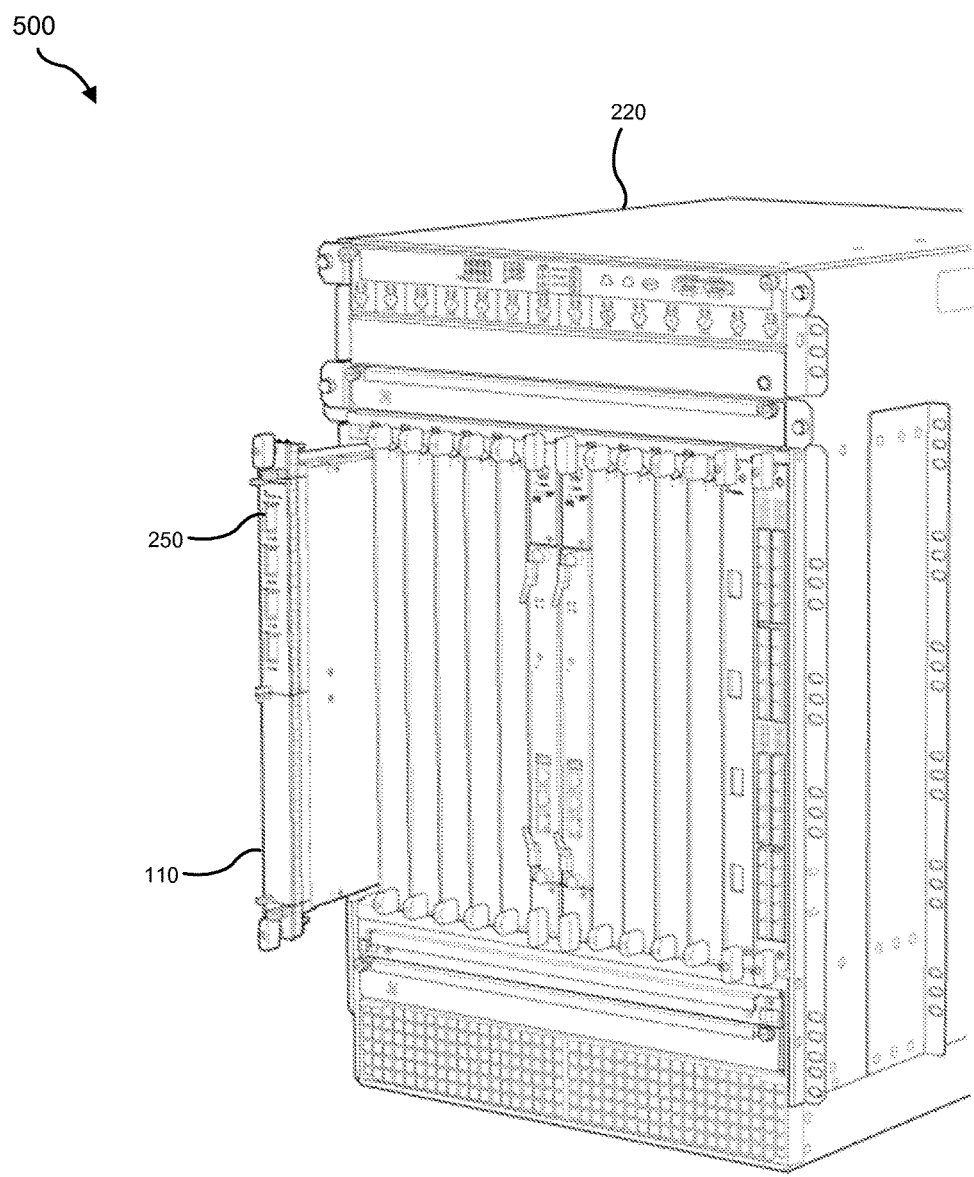
FIG. 5 is an exemplary block diagram of a router in the context of an exemplary system for customized port configuration.

FIG. 4 illustrates a timeline 400 of a specific path through state diagram 600. As shown in FIG. 4, at step 402 the modular port concentrator may be booted into default settings. At a subsequent step 404, the user may enter a customized port configuration, which may be invalid. Accordingly, immediately or substantially immediately and automatically (e.g., without committing or implementing the attempted port configuration), the modular port concentrator (e.g., through enforcement module 108, as discussed further below) may take remedial action, such as by blocking the attempted port configuration, warning the user, and/or suggesting a revised port configuration that satisfies system constraints. In response, at step 408 the user may enter a second customized port configuration, which may be valid. Subsequently, at step 410, the modular port concentrator may be rebooted and, after rebooting, the valid second customized port configuration may be automatically restored without reverting to the previous default settings (e.g., the default settings of step 402).

Figure 8:
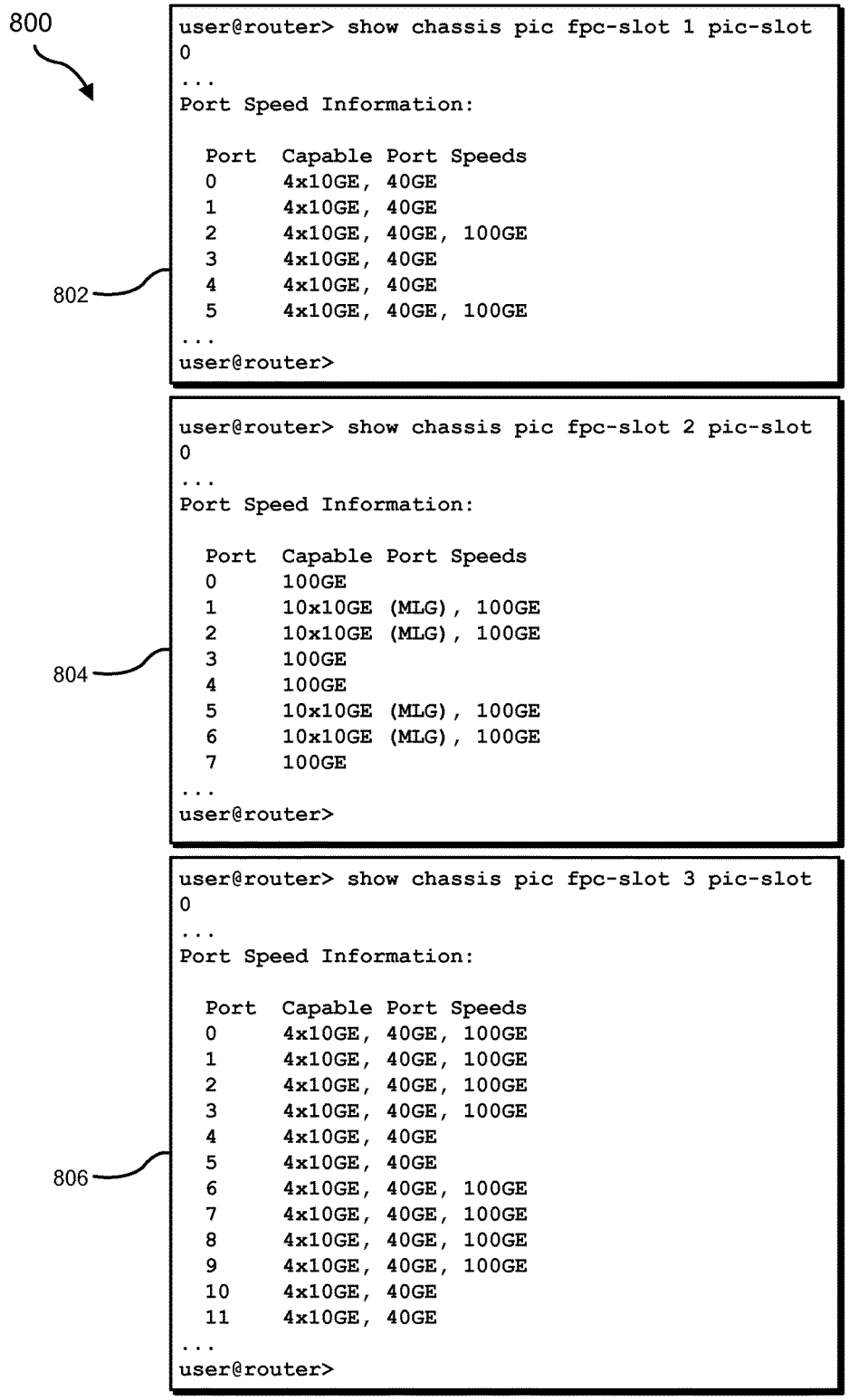
FIG. 8 is an exemplary block diagram of exemplary command line interface reports of network connection port speed configurations.

In some examples, configuration module 106 may also provide helpful or informative information for the user to enable the user to specify the attempted port configuration without violating the allowed port configuration profile. As first explained above, for some interface cards (e.g., 480G MRATE MPC7 physical interface card, 8x100GE CFP4 modular interface card, 12xQSFPP modular interface card, etc.) not all of the ports may support all of the network speed configurations available on other ports. Knowing the exact details of the supported network speed configurations for these interface cards and their specific ports will help users to configure the port profiles, as discussed above. Hence, the text-based interface may display the port speed capabilities for a specified interface card, such as those listed above and those with non-uniform port speed capabilities. In some examples, the text-based interface may correspond to an improved existing command line interface, which may include an enhanced version of the command "show chassis pic fpc-slot <FPC Slot> pic-slot <PIC Slot>". FIG. 8 shows exemplary command line interface reports 802, 804, and 806 that report the port speed capabilities of the 480G MRATE MPC7 physical interface card, 8x100GE CFP4 modular interface card, and 12xQSFPP modular interface card, respectively, and as outlined above. In further examples, configuration module 106 and/or the modular port concentrator may provide a visual indication of which network speed configuration from multiple network speed configurations applies to one or more network connection ports using one or more front panel light emitting diodes of the modular port concentrator and/or interface card (e.g., by matching diode colors, on/off states, and/or lighting/blinking patterns, intervals, or speeds to different network speed configurations).

Moreover, and as first discussed above with respect to state diagram 600 in FIG. 6, different models of modular port concentrator (and/or combinations of modular port concentrator and installed interface cards) may be configured with different default port profiles. FIG. 9 shows tables 900, which may include a table 902 that illustrates examples of default port profiles for various modular port concentrators and/or modular port concentrator and installed interface card combinations. These default port profiles may correspond to default port profile 620 in FIG. 6. Table 902 provides further details of these examples, which are merely exemplary and representative without being necessarily limiting with respect to the systems and methods disclosed herein.

Furthermore, different models of modular port concentrator (and/or combinations of modular port concentrator and installed interface cards) may also be configured, as customized by the user or software component, but not all conceivable user-customized configurations may be permitted. Returning to FIG. 9, tables 900 may also include a table 904 that illustrates examples of allowed customized port profiles for various modular port concentrators and/or modular port concentrator and installed interface card combinations. In this example, every combination may permit port level profile customization, but not every combination may permit one or more interface card level profile customizations. Table 904 provides further details of these examples, which are merely exemplary and representative without being necessarily limiting with respect to the systems and methods disclosed herein.

In contrast to the static mode discussed above, in other examples, configuration module 106 receives the attempted port configuration for the modular line card through the dynamic mode that enables the user to define the attempted port configuration by plugging or unplugging at the network connection port. In this approach, the user may configure each of the ports in the interface card with the desired or specified speed or in the automatic mode, which may correspond to the dynamic mode. Notably, the static mode and the dynamic mode may overlap in the sense that some ports may be configured according to one mode and other ports may be configured according to the other mode. Moreover, even though the dynamic mode may refer to dynamic interactions with the user (e.g., plugging and unplugging at network connection ports), the user may make the original specification of the dynamic mode for a specific port through the text-based interface that is otherwise associated with the static mode, as discussed above.

In the dynamic mode, if all the ports of an interface card are configured with specific network speed configurations, then configuration module 106 (e.g., in cooperation with enforcement module 108, as discussed further below) may ensure that the total bandwidth configured is less than a maximum packet forwarding engine bandwidth. Also, in some examples, plugging in a quad small form factor pluggable optics transceiver in a port will not affect the other ports. If any of the ports is configured in automatic mode, when the optics transceiver is plugged into a port, then configuration module 106 and/or enforcement module 108 may scan the ports from lower order ports to higher order ports (or according to any other predefined order, cascade, and/or heuristic, which may be notified to the user). If the total bandwidth exceeds the maximum packet forwarding engine bandwidth, the higher order ports will be disabled automatically until satisfying the bandwidth constraint (e.g., until satisfying all system constraints). When a port is disabled by this mechanism, the text-based interface may display an appropriate notification that explains the reasoning for disabling the port.

Returning to FIG. 7, dynamic mode configuration 706 shows an example of a command line interface configuration in which one port (i.e., port 0) is configured in the automatic mode, other ports are configured according to one or more static network speed configurations, and another port (i.e., port N) is disabled (which may correspond to an empty port). In other examples, the dynamic mode may be triggered by a specific flag for the entire interface card rather than a flag for a specific port, as in FIG. 7. Moreover, in some examples the user or system may lock a port (e.g., using a lock command in the text-based interface configuration command) so that its configuration cannot be altered by the plugging or unplugging at other ports, whereas in other examples all ports may be unlocked for potential modification in response to user action such as plugging and unplugging.

Returning to FIG. 3, at step 330, one or more of the systems described herein may enforce the allowed port configuration profile by taking remedial action in response to determining that the allowed port configuration profile does not allow the attempted port configuration. For example, enforcement module 108 may, as part of modular port concentrator 110, enforce allowed port configuration profile 202 by taking remedial action in response to determining that allowed port configuration profile 202 does not allow the attempted port configuration. As used herein, the term "remedial action" generally refers to an automated or autonomous action that a hardware component, such as a router, modular port concentrator, modular line card, and/or network management computer, takes in an attempt to prevent the violation of one or more hardware, manufacturer, and/or system constraints specified by the allowed port configuration profile (e.g., blocking the attempt, warning a user, and/or modifying the attempt to satisfy system constraints).

In one example, configuration module 106 receives the attempted port configuration in response to the user plugging at the network connection port according to the dynamic mode, as discussed above. The attempted port configuration may exceed a bandwidth constraint of a packet forwarding engine of the router. In response, enforcement module 108 may take remedial action by disabling at least one network connection port, thereby preserving or restoring the bandwidth at a level that satisfies the bandwidth constraint.

In a more specific example, an original valid configuration may correspond to: (1) port 0: 40G, (2) port 1: empty, (3) port 2: 100G, (4) port 3: empty, (5) port 4: empty, and (6) port 5: 100G. In this example, the total bandwidth constraint may be 240G and the current configuration may match the total bandwidth constraint. The user or a software component may then change the configuration on ports 0 and 4 as follows without affecting ports 2 and 5: (1) port 0: empty, (2) port 1: empty, (3) port 2: 100G, (4) port 3: empty, (5) port 4: 40G, and (6) port 5: 100G. The other ports may be unaffected because the modification merely switches the location of some bandwidth from one port to another port without violating the total bandwidth constraint or other constraints. In contrast, after further configuring port 0 in 40G mode, the second 100G port (i.e., port 5) may be disabled by enforcement module 108 because the total bandwidth exceeds 240G thereby resulting in the following: (1) port 0: 40G, (2) port 1: empty, (3) port 2: 100G, (4) port 3: empty, (5) port 4: 40G, and (6) port 5: 100G (disabled).

In general, enforcement module 108 may enforce the allowed port configuration profile by dynamically disabling one or more ports according to a predefined order or cascading mechanism until restoring the satisfaction of system constraints, including bandwidth constraints (e.g., thereby preserving a maximum amount of the user configuration that satisfies the system constraints while discarding or modifying a remainder of the user configuration). Enforcement module 108 may additionally or alternatively reduce a network speed configuration at one or more ports without disabling the ports to achieve the same effect. In all cases, however, the order of disabling and/or reducing bandwidth at the network connection ports may be made transparent and conspicuous to the user to facilitate user understanding.

In the dynamic mode, and especially in the static mode, enforcement module 108 may enforce the allowed port configuration profile by taking remedial action in the form of (A) blocking an invalid attempted port configuration, (B) warning a user about an invalid attempted port configuration, (C) requiring a user to enter a valid attempted port configuration after entering an invalid attempted port configuration, and/or (D) suggesting a valid port configuration, such as a valid port configuration that most closely matches an invalid attempted port configuration while satisfying system constraints. In the dynamic mode, enforcement module 108 may further immediately, automatically, and/or autonomously commit the suggested or nearest-best valid port configuration in response to the invalid attempted port configuration (e.g., in response to plugging at a port that triggers a constraint violation), as discussed further above, and in accordance with the predefined order or cascade for disabling ports and/or reducing connection speed configurations.

In summary, the following are some key advantages of the disclosed systems and methods. In an environment where a port speed is not uniquely determined by the hardware that is currently installed, using a software defined virtual interface card provides the flexibility and configuration persistency that is beneficial in a router configuration environment. The software defined virtual interface card may support seamless command line interface configuration migration between various previous and future line card models, as discussed above. The defined virtual interface card (or interface card structure) operating in MLG mode (e.g., simulating 10x10GE at the same port) provides the flexibility for the ports to be configured in the logical structure planned by the operator even when the physical hardware is operating at the higher bit rate of the combined physical MLG channel. For example, if the physical port at both ends of a link is a single 100GE QSPF28 connection then the virtual interface card allows the text-based interface to configure the port at the interface level as though the port is 10 logical 10GE interfaces. When not all combinations of physical modules are supported because of power or bandwidth reasons, the virtual interface card can enforce the legal or allowed configuration of the physical port before physical modules (e.g., fiber optic transceivers) are inserted. The virtual interface card can also ensure that once a port is configured traffic will not be interrupted while hardware for other ports is installed or removed.

As explained above, embodiments of the instant disclosure may enable computing network line cards to achieve benefits that were previously unavailable. For example, embodiments of the instant disclosure may enable computing network line cards to (1) configure different ports of a line card and/or interface card at different network speeds (e.g., on a per-port or per-interface-card basis), (2) reduce the number of line card production models by enabling one or more production models to simulate or emulate a variety of different network speed configurations, (3) restore a user customization of network speed configurations upon a line card or router reboot, (4) enable a user to plug or unplug a network connection port without disturbing other active ports on the line card, (5) disable one network connection port on the line card without disabling other network connection ports, thereby enabling the line card to reduce power consumption, (6) preserve some amount (e.g., a maximum amount) of a user customization of a line card port configuration while correcting or revising the user customization to prevent the violation of one or more system constraints, (7) seamlessly copy a customized port configuration from one modular port concentrator and/or interface card to another different model of a modular port concentrator and/or interface card, and/or (8) intelligently prevent a user from causing the line card to violate one or more constraints in terms of temperature, power, and/or packet forwarding engine bandwidth (e.g., on a per-port or total-port basis), etc.

Figure 10:
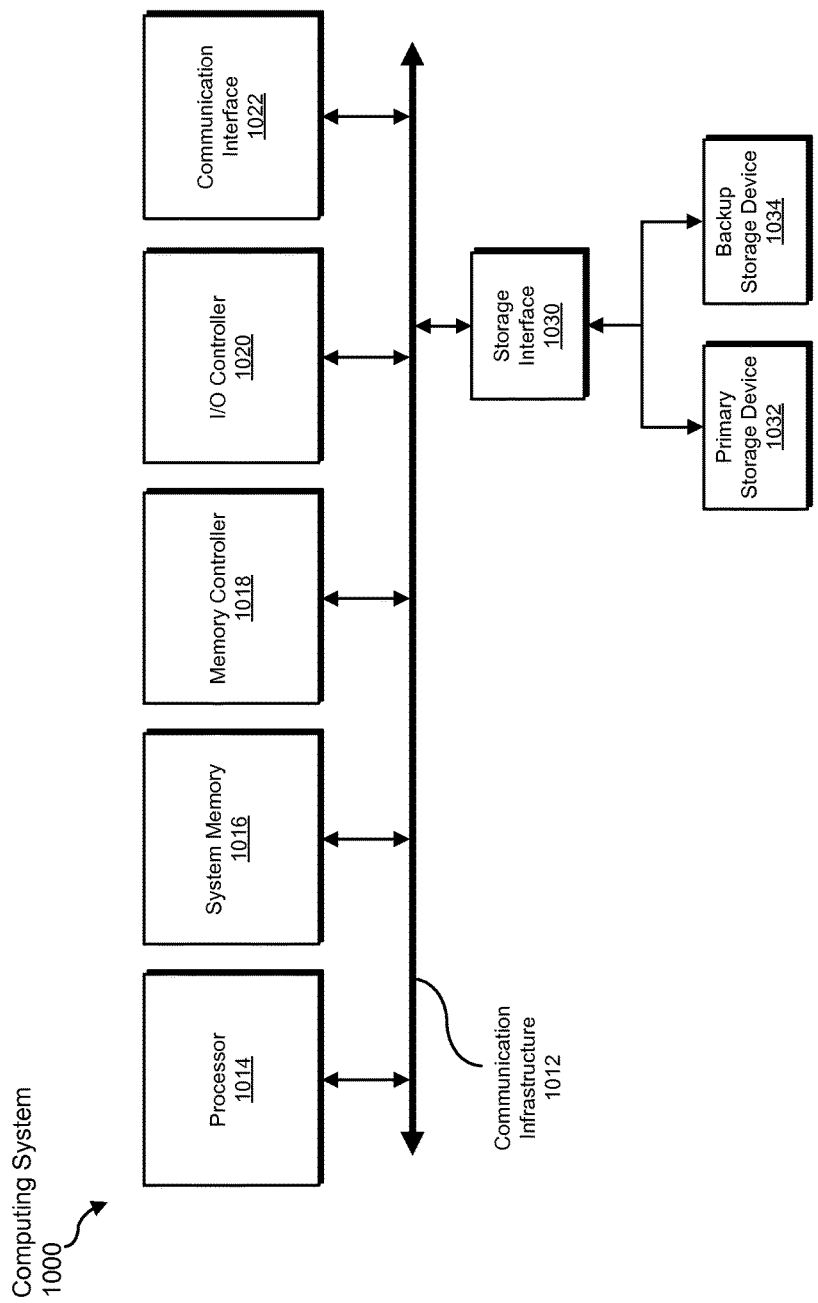
FIG. 10 is a block diagram of an exemplary computing system capable of implementing and/or being used in connection with one or more of the embodiments described and/or illustrated herein.

FIG. 10 is a block diagram of an exemplary computing system 1000 capable of implementing and/or being used in connection with one or more of the embodiments described and/or illustrated herein. In some embodiments, all or a portion of computing system 1000 may perform and/or be a means for performing, either alone or in combination with other elements, one or more of the steps described in connection with FIG. 3. All or a portion of computing system 1000 may also perform and/or be a means for performing and/or implementing any other steps, methods, or processes described and/or illustrated herein. In one example, computing system 1000 may include or correspond to system 100 from FIG. 1.

Computing system 1000 broadly represents any type or form of electrical load, including a single or multi-processor computing device or system capable of executing computer-readable instructions. Examples of computing system 1000 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1000 may be programmed, configured, and/or otherwise designed to comply with one or more networking protocols. According to certain embodiments, computing system 1000 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1000 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1000 may include various network and/or computing components. For example, computing system 1000 may include at least one processor 1014 and a system memory 1016. Processor 1014 generally represents any type or form of processing unit capable of processing data or interpreting and executing instructions. For example, processor 1014 may represent an application-specific integrated circuit (ASIC), a system on a chip (e.g., a network processor), a hardware accelerator, a general purpose processor, and/or any other suitable processing element.

Processor 1014 may process data according to one or more of the networking protocols discussed above. For example, processor 1014 may execute or implement a portion of a protocol stack, may process packets, may perform memory operations (e.g., queuing packets for later processing), may execute end-user applications, and/or may perform any other processing tasks.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1000 may include both a volatile memory unit (such as, for example, system memory 1016) and a non-volatile storage device (such as, for example, primary storage device 1032, as described in detail below). System memory 1016 may be implemented as shared memory and/or distributed memory in a network device. Furthermore, system memory 1016 may store packets and/or other information used in networking operations.

In certain embodiments, exemplary computing system 1000 may also include one or more components or elements in addition to processor 1014 and system memory 1016. For example, as illustrated in FIG. 10, computing system 1000 may include a memory controller 1018, an Input/Output (I/O) controller 1020, and a communication interface 1022, each of which may be interconnected via communication infrastructure 1012. Communication infrastructure 1012 generally represents any type or form of infrastructure capable of facilitating communication between one or more components of a computing device. Examples of communication infrastructure 1012 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1018 generally represents any type or form of device capable of handling memory or data or controlling communication between one or more components of computing system 1000. For example, in certain embodiments memory controller 1018 may control communication between processor 1014, system memory 1016, and I/O controller 1020 via communication infrastructure 1012. In some embodiments, memory controller 1018 may include a Direct Memory Access (DMA) unit that may transfer data (e.g., packets) to or from a link adapter.

I/O controller 1020 generally represents any type or form of device or module capable of coordinating and/or controlling the input and output functions of a computing device. For example, in certain embodiments I/O controller 1020 may control or facilitate transfer of data between one or more elements of computing system 1000, such as processor 1014, system memory 1016, communication interface 1022, and storage interface 1030.

Communication interface 1022 broadly represents any type or form of communication device or adapter capable of facilitating communication between exemplary computing system 1000 and one or more additional devices. For example, in certain embodiments communication interface 1022 may facilitate communication between computing system 1000 and a private or public network including additional computing systems. Examples of communication interface 1022 include, without limitation, a link adapter, a wired network interface (such as a network interface card), a wireless network interface (such as a wireless network interface card), and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1022 may also represent a host adapter configured to facilitate communication between computing system 1000 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also enable computing system 1000 to engage in distributed or remote computing. For example, communication interface 1022 may receive instructions from a remote device or send instructions to a remote device for execution.

As illustrated in FIG. 10, exemplary computing system 1000 may also include a primary storage device 1032 and/or a backup storage device 1034 coupled to communication infrastructure 1012 via a storage interface 1030. Storage devices 1032 and 1034 generally represent any type or form of storage device or medium capable of storing data and/or other computer-readable instructions. For example, storage devices 1032 and 1034 may represent a magnetic disk drive (e.g., a so-called hard drive), a solid state drive, a floppy disk drive, a magnetic tape drive, an optical disk drive, a flash drive, or the like. Storage interface 1030 generally represents any type or form of interface or device for transferring data between storage devices 1032 and 1034 and other components of computing system 1000.

In certain embodiments, storage devices 1032 and 1034 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1034 may also include other similar structures or devices for allowing computer software, data, or other computer-readable instructions to be loaded into computing system 1000. For example, storage devices 1032 and 1034 may be configured to read and write software, data, or other computer-readable information. Storage devices 1032 and 1034 may be a part of computing system 1000 or may be separate devices accessed through other interface systems.

Many other devices or subsystems may be connected to computing system 1000. Conversely, all of the components and devices illustrated in FIG. 10 need not be present to practice the embodiments described and/or illustrated herein. The devices and subsystems referenced above may also be interconnected in different ways from those shown in FIG. 10. Computing system 1000 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may process an attempted network port configuration by applying an allowed port configuration profile, thereby modifying how the router and modular line card process network traffic and further achieving the benefits outlined above. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a modular port concentrator that connects as a modular line card within a router to forward network packets, the modular port concentrator comprising an interface card that comprises a network connection port that supports a plurality of network speed configurations, the network connection port configured to receive a quad small form factor pluggable transceiver;
a profile module, stored in memory, that stores an allowed port configuration profile that defines supported port configurations for the modular port concentrator;
a configuration module, stored in memory, that receives an attempted port configuration for the modular line card through at least one of a static mode that enables a user to define the attempted port configuration through a text-based interface and a dynamic mode that enables the user to define the attempted port configuration by plugging or unplugging at the network connection port;
an enforcement module, stored in memory, that enforces the allowed port configuration profile by taking remedial action in response to determining that a sum of network speed configurations for each active network connection port of the attempted port configuration, which are each selected from one or more network speed configurations that each active network connection port supports, violates the allowed port configuration profile by exceeding a bandwidth constraint of a packet forwarding engine; and
at least one physical processor configured to execute the modular port concentrator, the profile module, the configuration module, and the enforcement module.

2. The system of claim 1, wherein the configuration module receives the attempted port configuration for the modular line card through the static mode that enables the user to define the attempted port configuration through the text-based interface.

3. The system of claim 2, wherein the text-based interface comprises a command line interface.

4. The system of claim 1, wherein the configuration module receives the attempted port configuration for the modular line card through the dynamic mode that enables the user to define the attempted port configuration by plugging or unplugging at the network connection port.

5. The system of claim 4, wherein:
the configuration module receives the attempted port configuration in response to the user plugging at the network connection port;
the enforcement module takes remedial action by disabling at least one network connection port.

6. The system of claim 1, wherein the allowed port configuration profile places a limit on a forwarding capacity of the modular port concentrator based on at least one of:
   a power constraint; and
   a temperature constraint.

7. The system of claim 1, wherein
   the network connection port supports the following plurality of network speed configurations:
   40 GE; and
   100 GE.

8. The system of claim 1, wherein at least one front panel light emitting diode of the modular port concentrator provides a visual indication of which network speed configuration from the plurality of network speed configurations applies to the network connection port.

9. The system of claim 1, wherein the configuration module enables the user to specify a different network speed configuration, from the plurality of network speed configurations, for the network connection port than for another network connection port on the same modular port concentrator.

10. The system of claim 1, wherein the remedial action comprises at least one of:
    blocking the attempted port configuration;
    modifying the attempted port configuration; and
    warning the user through a command line interface.

11. A method comprising:
    connecting a modular port concentrator as a modular line card within a router to forward network packets, the modular port concentrator comprising an interface card that comprises a network connection port that supports a plurality of network speed configurations, the network connection port configured to receive a quad small form factor pluggable transceiver;
    storing an allowed port configuration profile that defines supported port configurations for the modular port concentrator;
    receiving an attempted port configuration for the modular line card through at least one of a static mode that enables a user to define the attempted port configuration through a text-based interface and a dynamic mode that enables the user to define the attempted port configuration by plugging or unplugging at the network connection port; and
    enforcing the allowed port configuration profile by taking remedial action in response to determining that a sum of network speed configurations for each active network connection port of the attempted port configuration, which are each selected from one or more network speed configurations that each active network connection port supports, violates the allowed port configuration profile by exceeding a bandwidth constraint of a packet forwarding engine.

12. The method of claim 11, wherein receiving the attempted port configuration for the modular line card is performed through the static mode that enables the user to define the attempted port configuration through the text-based interface.

13. The method of claim 12, wherein the text-based interface comprises a command line interface.

14. The method of claim 11, wherein receiving the attempted port configuration for the modular line card is performed through the dynamic mode that enables the user to define the attempted port configuration by plugging or unplugging at the network connection port.

15. The method of claim 14, wherein:
    receiving the attempted port configuration is performed in response to the user plugging at the network connection port; and
    taking remedial action comprises disabling at least one network connection port.

16. The method of claim 11, wherein the allowed port configuration profile places a limit on a forwarding capacity of the modular port concentrator based on at least one of:
    a power constraint; and
    a temperature constraint.

17. The method of claim 11, wherein
    the network connection port supports the following plurality of network speed configurations:
    40 GE; and
    100 GE.

18. The method of claim 11, wherein at least one front panel light emitting diode of the modular port concentrator provides a visual indication of which network speed configuration from the plurality of network speed configurations applies to the network connection port.

19. The method of claim 11, wherein receiving the attempted port configuration further comprises specifying a different network speed configuration, from the plurality of network speed configurations, for the network connection port than for another network connection port on the same modular port concentrator.

20. A non-transitory computer-readable medium comprising one or more computer-readable instructions that, when executed by at least one processor of a computing device, cause the computing device to:
    store an allowed port configuration profile that defines supported port configurations for a modular port concentrator connected as a modular line card within a router to forward network packets, the modular port concentrator comprising an interface card that comprises a network connection port that supports a plurality of network speed configurations, the network connection port configured to receive a quad small form factor pluggable transceiver;
    receive an attempted port configuration for the modular line card through at least one of a static mode that enables a user to define the attempted port configuration through a text-based interface and a dynamic mode that enables the user to define the attempted port configuration by plugging or unplugging at the network connection port; and
    enforce the allowed port configuration profile by taking remedial action in response to determining that a sum of network speed configurations for each active network connection port of the attempted port configuration, which are each selected from one or more network speed configurations that each active network connection port supports, violates the allowed port configuration profile by exceeding a bandwidth constraint of a packet forwarding engine.

* * * * *